Nov. 11, 1969  T. T. TIDWELL  3,477,394

METHOD FOR MAKING CANDY WITH GUM INSIDE

Filed Nov. 28, 1966

INVENTOR
THOMAS T. TIDWELL
BY
ATTORNEY

United States Patent Office 3,477,394
Patented Nov. 11, 1969

3,477,394
METHOD FOR MAKING CANDY WITH GUM INSIDE
Thomas T. Tidwell, Atlanta, Ga. (% Triple T. Company Inc., 1495 Stoneridge Drive, Stone Mountain, Ga. 30083)
Filed Nov. 28, 1966, Ser. No. 597,362
Int. Cl. A23g *3/08, 3/20, 3/30*
U.S. Cl. 107—54     2 Claims

ABSTRACT OF THE DISCLOSURE

A method of making a hard candy pop or sucker with bubble gum inside which comprises making a batch of workable candy and then placing the hubble gum mixture on the candy and folding the candy over the bubblegum after which the mixture of candy and gum is made into a rope-like form and fed into a commercially available sucker forming machine which makes bubblegum suckers.

---

Candy is a treat for children and so is bubble gum. Candy with bubble gum inside is a different treat especially on a stick. Bubble gum pops or suckers have been well known for some time. In fact, candy, coated gum per se is quite old. The present invention is directed to the production method or procedure for making bubble gum pops.

According to the present method, bubble gum is made from bubble gum base, with sugar, corn syrup, coloring and flavoring in the usual way, and then heated and mixed. A batch of hard candy is made from sugar and corn syrup and with sufficient aqueous mixture is cooked to about 275° F. and allowed to cool until it partially sets up to workable form at about 150° F. and the batch of bubble gum is placed on the sheet of hard candy so formed and the sheet of candy is folded around the batch of bubble gum to completely jacket the bubble gum within the hard candy. The candy jacketed bubble gum when firm enough to handle is placed in the candy batch roller which spins the batch into a rope that is fed into a roller-sucker forming machine which forms the suckers in various sizes and shapes according to the engraved dies in the machine and inserts a paper stick therein. The suckers, which are still hot and soft, are dropped onto an air cooled conveyor belt and afterwards, when cooled, are wrapped for shipment.

The primary object of this invention is to disclose a method for making a candy sucker having bubble gum inside.

Another object of this invention resides in the particular manner in the method of getting the bubble gum into the hard candy in an economical way so that it can be rapidly made into suckers on a sucker-making machine.

Still another object of this invention resides in the method whereby both the hard candy and the bubble gum are combined while still heated so that they may be more easily worked with and combined before they cool.

Other and further objects and advantages of my invention will become apparent upon reading the following specification taken in conjunction with accompanying drawing, in which.

Bubble gum is made in a conventional way by placing 135 pounds of bubble gum base in a steam jacketed mixer and heating same to approximately 150 degrees F. to which is then added 160 pounds of corn syrup. The heated bubble gum base and the corn syrup are thoroughly mixed by rotary blades. Both the steam jacketed mixer and the rotary blades are common apparatus in the candy-making industry and one such device is the Baker-Perkins steam jacketed mixer with "zigma" blades. After the mixture is properly combined, 615 pounds confectioners 10X sugar with suitable quantities of U.S. Certified food coloring and flavoring is added thereto to create the proper coloring and flavoring of the bubble gum. When the mixing of the hubble gum batch is completed, a 35 pounds batch 12 of same is placed in a heated batch roller (a common machine) and heated to approximately 115 degrees F. for further processing with a hard candy batch now to be described.

Figure 1:
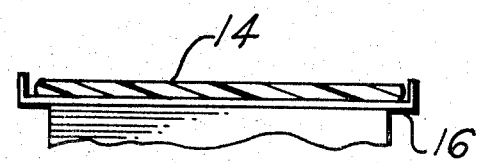
FIG. 1 is a diagrammatic view of an initial step in making a bubble gum pop by the present method.

By mixing in a copper kettle 45 pounds of granulated sugar and 40 pounds of corn syrup (regular 43 degree Baumé 42 Dextrose equivalent) an 85 pound batch 14 of hard candy is made, by suitable mixing, to which is added a sufficient amount of water to allow the sugar and corn syrup to mix thoroughly. This 85 pound batch mixture of hard candy 14 is then cooked in the kettle at a temperature between 250°–300° F. preferably 275 degrees F., then put in a "Simplex" vacuum cooker to remove excess moisture, and then poured onto a conventional water-cooled steel slab table and allowed to cool into a sheet (FIG. 1) until it partially sets up to workably form at 200 degress F., at which time sufficient U.S. Certified food coloring, and artificial flavoring are thoroughly worked into the batch by folding and refolding the candy on the cooling slab 16 until the coloring and flavoring are evenly distributed throughout the batch.

Figure 2:
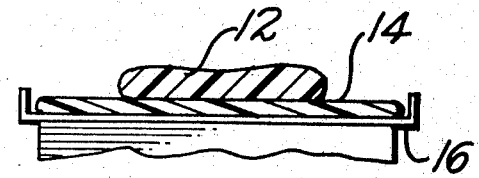
FIG. 2 is a diagrammatic view of another step in the method after the step of FIG. 1.
Figure 3:
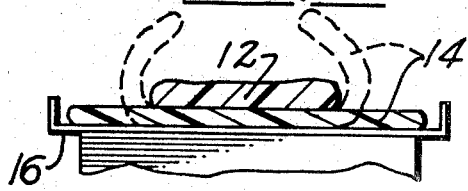
FIG. 3 is a diagrammatic view of another step after the one in FIG. 2.
Figure 4:
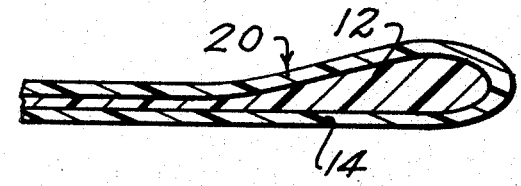
FIG. 4 is a diagrammatic view of another step after the step in FIG. 3.

Upon cooling of the 85 pound batch 14 of hard candy at a temperature between 125°–175° F. preferably approximately 150 degrees F., the 35 pound selected batch 12 of bubble gum which is at a temperature between 100°–125° F. of about 115 degrees F. is placed onto the sheet of hard candy 14 (FIG. 2) on the flat surface of a candy table 16 and then the sheet of hard candy 14 is folded around the batch of bubble gum 12 so as to completely jacket and encapsulate the bubble gum within the sheet of hard candy which is to surround the bubble gum (FIG. 3).

Figure 5:
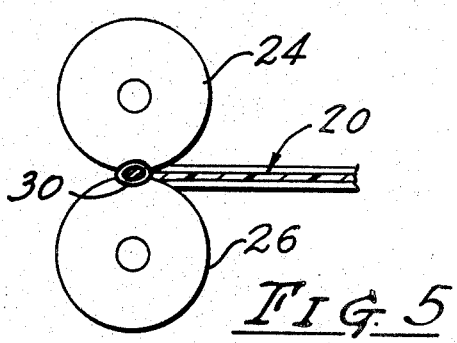
FIG. 5 is a diagrammatic view of the product in FIG. 4 being made into individual suckers or pops to complete the procedure.
Figure 6:
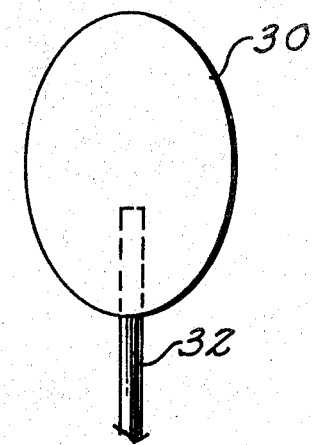
FIG. 6 is a front elevation view of a typical sucker made by the present method.

When the candy jacketed bubble gum batch 20 is firm enough to handle, it is then placed into a candy batch roller which spins the batch into a rope 30 (see FIG. 5) approximately two inches in diameter and which has the bubble gum inside thereof substantially as a center. The spun rope is fed into an automatic roller type sucker forming machine, which is a common and conventional machine, such as a "Racine," available in the candy industry and which per se forms no part of this invention. A typical sucker machine has two opposing cylindrical engraved dies 24, 26 (FIG. 5) which compress the candy and bubble gum rope 20 into the desired shape of a hard candy sucker 30 with the bubble gum inside thereof and also places a stick 32, usually made of paper, automatically into each sucker by the roller type forming procedure on the machine. The bubble gum candy jacketed sucker is formed automatically by the roller dies in production as the candy is compressed around the bubble gum and the stick inserted thereinto.

Figure 7:
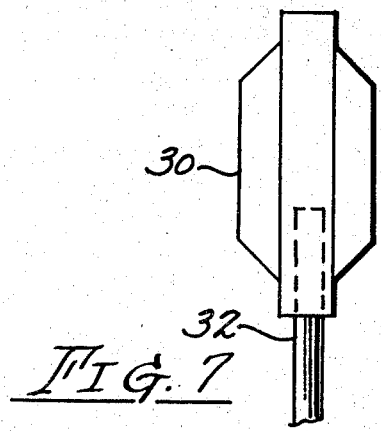
FIG. 7 is a side elevation view of the sucker shown in FIG. 6.

Typically, the engraved dies 24, 26 of the conventional sucker making machine may be constructed in such a manner as to form elliptical shape suckers 30 seen in FIGS. 7 and 8, weighing approximately one ounce each and being approximately 1 and ½ inches wide, 2 inches long, ¾ of an inch thick with a small ridge ¼ inch wide protruding about 1/16 of an inch from the main surface on the edge of the sucker to assure positive closure of the seams of the hard candy around the bubble gum that is inside. However, various sizes and shapes of bubble gum filled hard candy suckers 30 can be manufactured by this method and any particular size, shape, or form is merely illustrative from a possibility of great many different ones.

The completed and sealed suckers 30 with the stick permanently inserted therein, while still hot and soft, are dropped onto a conventional air-cooled conveyor belt, (not shown) commonly found in the candy industry, of proper length and speed to cool and harden the suckers in an air-conditioned room which maintains an approximate temperature of 68 degrees F. and relative humidity of 50%.

Suckers that are cooled to a temperature of 100 degrees F. are inserted into an automatic wrapping machine, also a common piece of equipment in the candy industry (not shown), which places a wrapping material around the sucker and twists and wraps or heat seals it on a sucker stick, thus protecting the finished product, keeping it clean and maintaining it in excellent sanitary condition for human consumption.

While I have shown and described the particular embodiment of my invention, together with suggested procedures and equipment to follow, this is by way of illustration only and does not constitute any sort of limitation on the scope of my invention since various alterations, changes, deviations, eliminations, substitutions, omissions, additions, alterations, and ramifications may be made in the methods described herein without departing from the scope of my invention as defined in the appended claims.

What is claimed:

1. In a method for making candy with gum inside, such as making a hard candy pop or sucker with bubble gum inside, the steps comprising:

(a) preparing a batch of workable gum, as for example by the usual and conventional procedure of mixing the bubble gum base with other ingredients such as corn syrup, coloring, sugar, and flavoring and then heating and mixing the batch, (b) preparing a batch of hard candy, as for example, by the usual method of taking sugar and corn syrup together with a sufficient amount of aqueous mixture and then cooking same to sufficient temperature and cooling same to a workable temperature, (c) placing the gum on the mass of hard candy and folding the candy around the batch of gum to completely jacket the gum with hard candy, (d) making an elongated rope-like form of said candy mass with the gum inside, and then cutting individual units such as pops or suckers from the roue-like form by delivering said rope-like form to a conventional, commercial sucker forming machine, wherein individual suckers are made (e) the candy batch being cooked at a temperature between 250°–300° F., and then poured onto a table surface and cooled into a sheet to between 125°–175° F., the gum being cooled to approximately between 100° and 125° F., and the candy covered gum being cooled firm enough to handle, and then elongated.

2. The method of claim 1 wherein said elongated candy covered gum is run through a sucker forming machine and made into suckers or gum pops.

References Cited
UNITED STATES PATENTS

| | | | |
|---|---|---|---|
| 1,771,982 | 7/1930 | Mustin | 99—135 |
| 2,559,648 | 7/1951 | Lindhe | 107—10 X |
| 2,874,649 | 2/1959 | Pelletier. | |
| 3,062,662 | 11/1962 | McDonald | 99—135 X |
| 3,208,405 | 9/1965 | Beer | 99—135 X |
| 3,272,152 | 9/1966 | Williams. | |
| 1,318,292 | 10/1919 | Laskey. | |
| 1,542,710 | 6/1925 | Laskey. | |
| 2,604,056 | 7/1952 | Mahle. | |

WALTER A. SCHEEL, Primary Examiner

R. I. SMITH, Assistant Examiner